June 14, 1966

J. P. L. G. F. VRANKEN 3,256,080

METHOD AND APPARATUS FOR THE PRODUCTION OF CURVED AND
HARDENED PANES OF GLASS

Filed Aug. 15, 1961

INVENTOR:
JEAN-PAUL LEON GHISLAIN FELIX VRANKEN

BY E. M. Squire

HIS ATTY

June 14, 1966  J. P. L. G. F. VRANKEN  3,256,080
METHOD AND APPARATUS FOR THE PRODUCTION OF CURVED AND
HARDENED PANES OF GLASS
Filed Aug. 15, 1961  2 Sheets-Sheet 2

INVENTOR:
JEAN-PAUL LEON GHISLAIN FELIX VRANKEN
BY
E. M. Squire
HIS ATTY.

United States Patent Office 3,256,080
Patented June 14, 1966

3,256,080
METHOD AND APPARATUS FOR THE PRODUCTION OF CURVED AND HARDENED PANES OF GLASS
Jean Paul Leon Ghislain Felix Vranken, Jemeppe-sur-Sambre, Belgium, assignor to Glaceries Reunies, Société Anonyme, Jemeppe-sur-Sambre, Belgium
Filed Aug. 15, 1961, Ser. No. 131,590
Claims priority, application Belgium, Aug. 24, 1960, 472,362, Patent 594,360
5 Claims. (Cl. 65—104)

My invention relates to a method of and an apparatus for the production of curved and hardened or tempered sheets of glass.

In conventional apparatus the sheets of glass on leaving the furnace are subjected to a curving or forming operation by means of shaper moulds and to a hardening operation by means of jets of air or some other fluid.

These two operation are ordinarily carried out separately at two different stations. After heating in a furnace, the usual shaping and tempering takes place in the following stages:

(1) First, positioning of the heated glass leaving the furnace between the shaper moulds;

(2) In this first position, curving by pressure between solid moulds;

(3) Second, positioning the curved glass between blowing elements;

(4) In this second position, tempering by means of jets of air or some other fluid.

During the course of this procedure, there is a time interval which elapses between the forming and tempering operations and during which the glass, which has not yet been tempered, may become distorted while suspended from its supporting clamps. Such distortion will render the product unusuable.

The object of the invention is to avoid this possibility of deformation. A further object of the invention is to increase the speed of the shaping and tempering operations, thus enabling the heating temperature to be reduced.

Another object is to obtain panes or sheets of glass, the edges of which have cooled comparatively slowly providing increased strength, thus giving greater safety in the handling and installation of the curved glass.

To these ends, the method is characterized essentially in that the curving and hardening operations are both carried out with the glass held in the same position after the glass leaves the furnace. The glass is pressed between two cooperating moulds comprising frames which engage only the periphery of the glass, the central portion of the glass being exposed at all times for access by the tempering jets.

This frame is generally formed by a frame of metal or any other material which may, if desired, be covered with an insulating material (glass fabric for example).

In order that the invention may be more readily understood, an embodiment of the invention will be described hereinafter with reference to the accompanying drawings.

Figure 1:
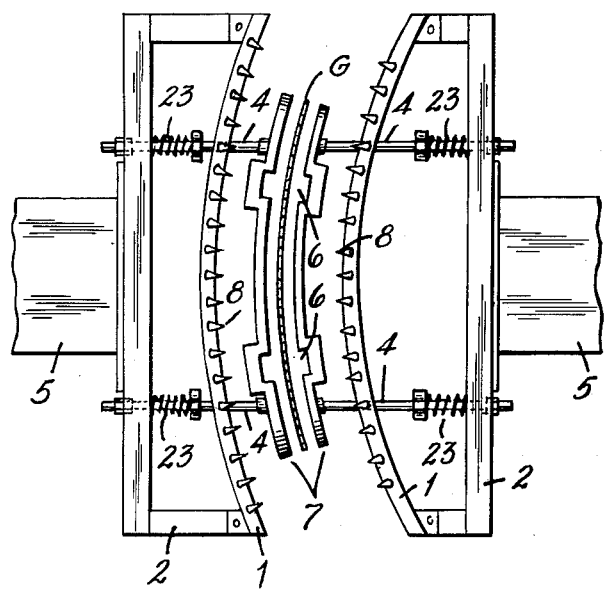
FIG. 1 is a plan view showing the combined forming and tempering systems.
Figure 2:
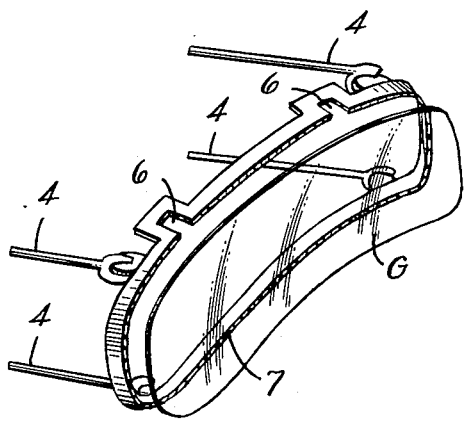
FIG. 2 is a perspective view showing the female peripheral frame of the shaper mould.
Figure 3:
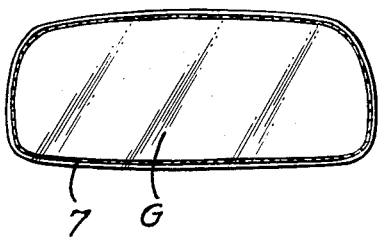
FIG. 3 is a detail showing the position of the frame with respect to the pane of glass.

As shown in FIG. 1 for the practical performance of the method, use is made in known manner for two blowing grids 1, for example, each of which is carried by a separate framework 2.

For the curving of the glass, two shaper moulds 7 are provided and are fixed on rods 4 each of which, according to the invention, passes through an associated tempering air blowing grid 1 (FIG. 1) and is connected to a grid framework 2 which is in turn fixed on a press member 5 or on an element which can cause the shaper moulds 7 to be moved toward or away from the glass denoted by reference character G.

The shaper moulds 7 have slots 6 to permit the passage of the suspension clamps (not shown) which support the glass for positioning it between the peripheral moulds 7. The shaper moulds are formed by a frame of metal or any other material which may, if desired, be covered with a thermally insulative material. The rods 4, which support each of the frames 7, are longitudinally slidable in their respective frameworks 2. A helical compression spring 23 surrounds each of the rods 4 and yieldingly urges the frame 7 supported by the rod 4 associated therewith toward its cooperating frame 7, thus serving as a thickness compensator which accommodates variations in the thickness of the glass G which is being formed.

After it has been heated to the required softening temperature, the glass is immediately positioned between the shaper moulds 7 in the exact shaping position, the moulds then being spaced sufficiently far apart to permit the free passage of the hot glass therebetween in its flat or other condition prior to the forming operation.

The sharper moulds are then immediately pressed into contact with the periphery of the glass, this operation forming the entire softened sheet of glass into the desired curved shape.

The blowing of air through the nozzles 8 to temper the glass G may then be started as soon as the displacement of the moulds 7 has been completed.

Throughout all, or at least a part of the tempering operation, the glass G is held pressed between the shaper frames 7.

The grid framework 2 being fixed on the press member 5, the grid system moves together with the moulds when the latter are brought together or are moved apart, but are spaced behind said moulds at the most suitable distance for good hardening.

The forming and air tempering operations may therefore be carried out while the glass is securely peripherally held in a fixed position.

The entire operation after heating in the furnace is thus limited to two successive stages:

(1) Transfer of the heated sheet from the furnace to a predetermined fixed station;

(2) The following operations are performed at this station: the shaper moulds are brought together producing the desired curved configuration, the glass, while held between the moulds, is tempered by air blowing, the formed and tempered glass is freed by separation of the moulds.

This method offers advantages over conventional methods wherein the forming is performed at a first station and the tempering is performed at a second station because the transfer time between stations is eliminated. It also present advantages over methods wherein the central area of the glass is touched by the forming moulds because the edges of the formed sheet are cooled more slowly than the central portion. This reduces the brittleness of the edges while permitting the central portion of the sheet to be rapidly tempered to maintain its shape.

By avoiding any transfer between two stations, the possibility of deformation of the glass prior to tempering is prevented. The fact that the glass is peripherally held after forming and during tempering permits the use of a lower softening temperature. The total time required for the forming and tempering operations is thus reduced with respect to conventional methods.

Figure 4:
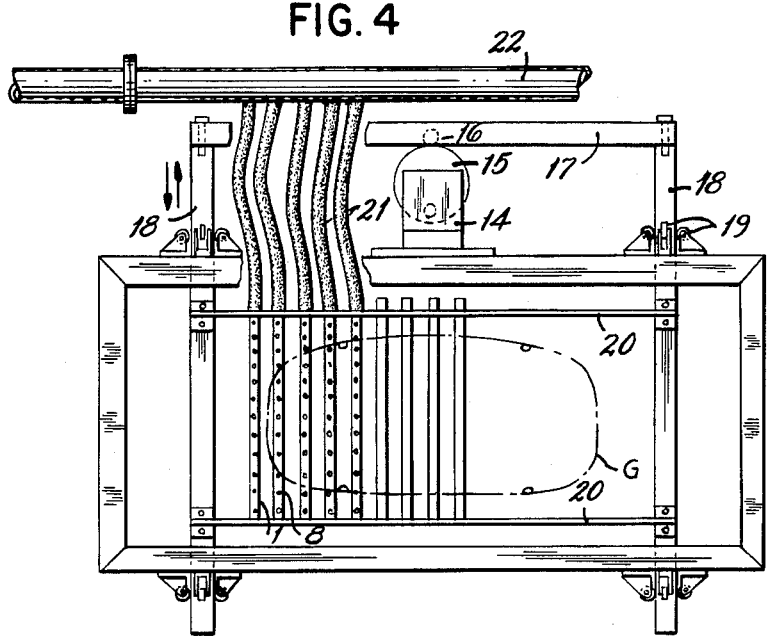
FIG. 4 is an elevation and FIG. 5 a plan view diagrammatically illustrating the complete apparatus.
Figure 5:
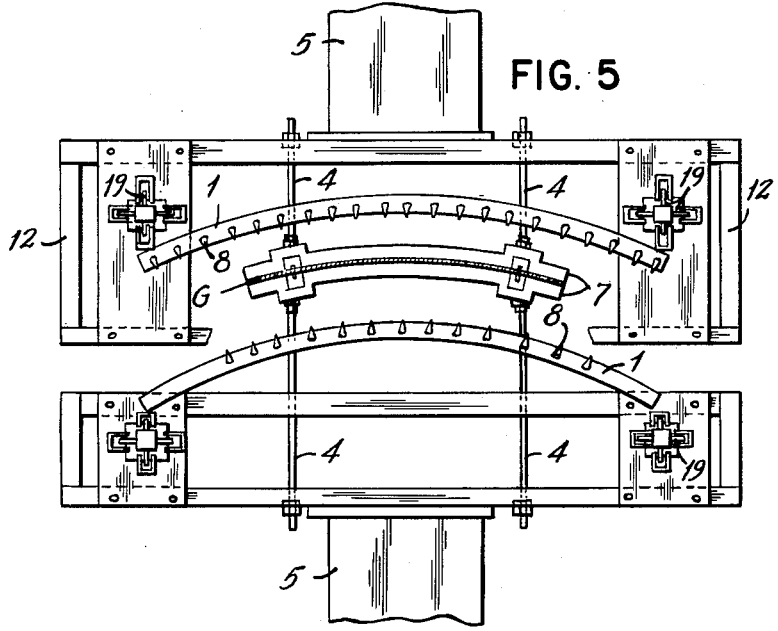

FIGS. 4 and 5 show in greater detail apparatus embodying the invention which comprises shaper frames 7, the blowing grids 1 with the nozzles 8 for blowing air through the shaper frames 7, and the press members 5. The shaper moulds 7, provided with slots 6 for the passage of the suspension clamps, are formed, from a frame of metal or any other material which may, if desired, by covered with thermally insulative material. Springs 23, the tension of which is adjustable, may be provided, as shown in FIG. 1, which act as thickness compensators to accommodate glass sheets G of slightly differing thicknesses.

The blowing grids 1 which are fixed by cross-members 20 to vertically movable guide members 18, are movable in a vertical direction with a reciprocating movement. To this end, the motor and reduction gear 14 fixed on the framework 12 drives an adjustable cyclically operative cam 15 which actuates a movable cam follower roller 16 fixed on the cross-member 17, which drives the system of guide members 18, guidance of which is effected by means of four sets of guide rollers 19 mounted on the frame 12.

Hoses 21 provide a flexible connection to the air supply manifold 22 (FIG. 4).

What I claim is:

1. Apparatus for forming and tempering glass sheets comprising: two cooperating frame members arranged for simultaneous engagement with opposite sides of a softened glass sheet continuously substantially throughout the entire periphery of said sheet, both surface areas at opposite sides of said sheet within said periphery being free and fully exposed, said frame members being shaped to impart a curved configuration to said periphery of said sheet by pressing said periphery therebetween, the central portion of said sheet extending within said exposed areas being curved by the curving of said periphery, said frame members being separable to an extent sufficient to permit the free passage of said sheet therebetween prior to engagement of said sheet by said frame members; air blowing means connected to said frame members for movement therewith, said blowing means being positioned to direct a flow of air upon said exposed areas for tempering said sheet with said sheet held between said frame members; and press means connected to said frame members for selectively pressing said frame members into engagement with said periphery of said sheet and separating said frame members to free said sheet.

2. Apparatus according to claim 1, further comprising cyclically operative means connected for displacement of said blowing means with respect to said exposed areas.

3. Apparatus according to claim 1, further comprising resilient means included in the connection between said press means and said frame members for permitting the accommodation of sheets of differing thicknesses between said frame members.

4. The method of producing a curved glass sheet which comprises the steps of: heating said sheet to soften the same; pressing opposite sides of effectively the entire periphery of said sheet while softened to impart the desired curvature thereto while maintaining all of the portion of said sheet within said periphery exposed; tempering said sheet by directing a flow of cooling air upon said exposed portion thereof while maintaining said periphery pressed; and freeing said sheet after completion of said tempering step.

5. The method according to claim 4, which comprises the further step of cyclically displacing said flow of air during said tempering step.

References Cited by the Examiner

UNITED STATES PATENTS

| | | | |
|---|---|---|---|
| 2,251,159 | 7/1941 | Owen | 65—104 |
| 2,270,470 | 1/1942 | Paddock | 65—106 |
| 2,536,905 | 1/1951 | Bird et al. | 65—348 X |
| 2,677,918 | 5/1954 | Bird et al. | 65—348 X |
| 2,853,835 | 9/1958 | Tallent | 65—308 |

FOREIGN PATENTS 541,626   5/1957   Canada.

DONALL H. SYLVESTER, *Primary Examiner.*

A. D. KELLOGG, *Assistant Examiner.*